(12) United States Patent
Lill et al.

(10) Patent No.: US 8,805,549 B2
(45) Date of Patent: Aug. 12, 2014

(54) INTERFACE DEVICE WITH INTEGRATED SENSOR INTERFACE UNITS FOR AN ELECTRONIC SENSOR SYSTEM

(75) Inventors: Anton Lill, Lauffen (DE); Juergen Bauer, Tamm (DE)

(73) Assignee: VALEO Schalter und Sensoren GmbH, Bietigheim-Bissingen (DE)

( * ) Notice: Subject to any disclaimer, the term of this patent is extended or adjusted under 35 U.S.C. 154(b) by 1109 days.

(21) Appl. No.: 12/305,021

(22) PCT Filed: Jun. 29, 2007

(86) PCT No.: PCT/EP2007/005757
§ 371 (c)(1),
(2), (4) Date: Dec. 16, 2008

(87) PCT Pub. No.: WO2008/003429
PCT Pub. Date: Jan. 10, 2008

(65) Prior Publication Data
US 2009/0210074 A1 Aug. 20, 2009

(30) Foreign Application Priority Data
Jul. 3, 2006 (DE) .......................... 10 2006 030 616

(51) Int. Cl.
*G05B 19/02* (2006.01)
*G01D 21/00* (2006.01)

(52) U.S. Cl.
CPC ............... *G01D 21/00* (2013.01); *G05B 19/02* (2013.01)
USPC ........... 700/19; 370/254; 702/62; 340/870.02

(58) Field of Classification Search
CPC .................................................... G01D 21/00
USPC ........... 700/19; 370/254; 702/62; 340/870.02
See application file for complete search history.

(56) References Cited

U.S. PATENT DOCUMENTS 6,124,806 A * 9/2000 Cunningham et al. ... 340/870.02
6,198,996 B1 3/2001 Berstis
(Continued)

FOREIGN PATENT DOCUMENTS

DE 698 09 965 T2 11/2003
DE 102 43 783 A1 3/2004
(Continued)

OTHER PUBLICATIONS

English Translation (EP 572303 A1), Didier P et al. 19931201, Detected signal processing system with multiple processing channels includes signal pointing circuit directing detected signal to appropriate processing channel according to preset criteria.*

(Continued)

*Primary Examiner* — Tejal Gami
(74) *Attorney, Agent, or Firm* — Osha Liang LLP

(57) ABSTRACT

The invention relates to an interface device (100) for an electronic sensor system (200) comprising a plurality of sensors (210, 220) and a processing unit (230) for controlling the sensors (210, 220) and/or analyzing sensor data obtained by the sensors (210, 220), where the sensors (210, 220) can be connected to the processing unit (230) via the interface device (100).
According to the invention, the interface device (100) is able to accommodate simultaneously at least two sensor interface units (110, 120) for connecting to the sensors (210, 220), where each sensor interface unit (110, 120) can be selected from a plurality of sensor interface units, which differ at least by a different number of sensor channels.

9 Claims, 1 Drawing Sheet

(56) References Cited

U.S. PATENT DOCUMENTS

2004/0243323 A1* 12/2004 Kuenzler et al. ............ 702/62
2005/0185198 A1* 8/2005 Silverbrook ............... 358/1.1

FOREIGN PATENT DOCUMENTS

| DE | 10 2004 025 484 A1 | 12/2005 |
| EP | 572303 A1 * | 12/1993 |
| EP | 1 462 681 A | 9/2004 |
| GB | 2 251 948 A | 7/1992 |
| WO | 99/32856 A1 | 7/1999 |
| WO | 00/28285 A | 5/2000 |
| WO | 00/55646 A | 9/2000 |
| WO | 2007/115055 A | 10/2007 |

OTHER PUBLICATIONS

Advantech. Jan. 2005, Remote DA&C Modules, 26 pages.*
International Search Report w/translation from PCT/EP2007/005757 dated Sep. 11, 2007 (8 pages).
European Office Action issued in Eupropean Patent Application No. 07764 932.5, mailing date Aug. 26, 2013, with English translation thereof (4 pages).
German Search Report issued in German Patent Application No. 10 2006 030 616.3, mailing date Apr. 25, 2007, with English translation thereof (6 pages).

* cited by examiner

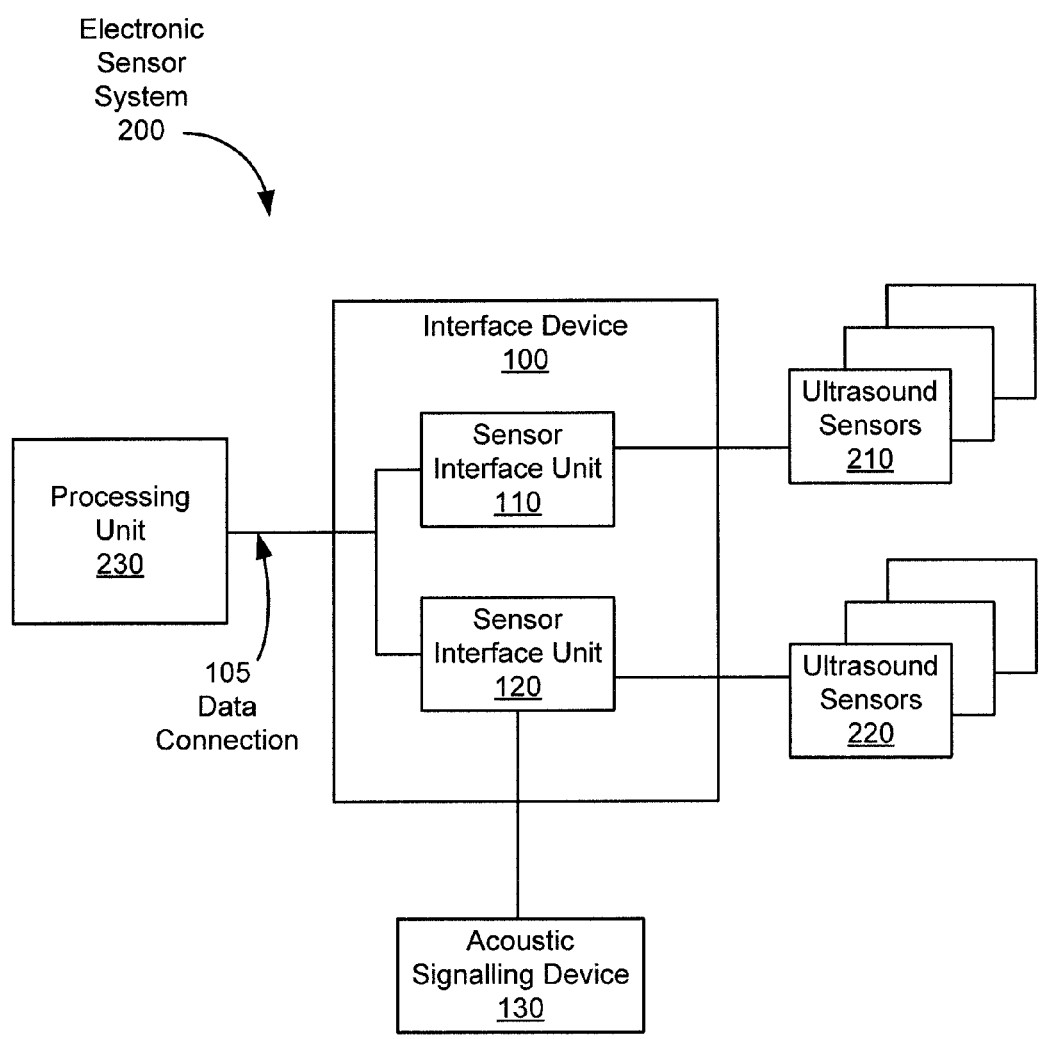

INTERFACE DEVICE WITH INTEGRATED SENSOR INTERFACE UNITS FOR AN ELECTRONIC SENSOR SYSTEM

The present invention relates to an interface device for an electronic sensor system comprising a plurality of sensors and a processing unit for controlling the sensors and/or analysing sensor data obtained by the sensors, where the sensors can be connected to the processing unit via the interface device.

The present invention also relates to an electronic sensor system containing such an interface device.

Known interface devices of this type often comprise a multiplicity of discrete electronic components such as resistors, capacitors, diodes, transistors, operational amplifiers and various integrated circuits, for instance level-converter ICs, and other circuit components, and are consequently costly to manufacture.

Depending on the sensors used or according to the intended target system into which the electronic sensor system or the associated interface device is to be integrated, there are often various options for connecting the processing unit to the sensors, which are meant to cover everything by the same interface device as far as possible.

It is provided in another proposal from the prior art to integrate in an interface device all necessary devices and components, or a corresponding set of functions, that are required to satisfy the maximum requirements e.g. as regards the number of sensors to be controlled. The serious disadvantage with this proposal is that, on average, only insufficient use is made of the available resources, because in all applications in which fewer requirements need to be met than the maximum requirements, most of the functions integrated in the conventional interface device are not used. Hence the higher manufacturing costs for such an interface device are not justified in most applications, in which only a few sensors need to be controlled for example.

Hence it is the object of the present invention to improve an interface device of the type cited in the introduction and a corresponding electronic sensor system in such a way that there is increased flexibility as regards embodiment options and/or configurability.

According to the invention, this object is achieved in an interface device of the type cited in the introduction by the interface device being able to accommodate simultaneously at least two sensor interface units for connecting to the sensors, where each sensor interface unit can be selected from a plurality of sensor interface units, which differ at least by a different number of sensor channels.

This means that, according to the invention, different sensor interface units can be provided, which can be integrated in the interface device according to the invention depending on the application. It is particularly advantageous that the interface device according to the invention is able to accommodate simultaneously at least two sensor interface units. Hence, depending on the application, there is advantageously the possibility of providing two sensor interface units simultaneously in the interface device, for example to operate numerous sensors. On the other hand, according to the invention, it is also possible to operate the interface device with just one sensor interface unit, which increases the cost-efficiency of the entire system in particular in those applications in which only a few sensors must be controlled, for instance.

It is also possible to equip the interface device according to the invention with more than two sensor interface units.

In addition to the variable number of sensor interface units, which can be used primarily to define the maximum number of sensors to be controlled by the processing unit, the capability according to the invention of populating the interface device simultaneously with a plurality of sensor interface units provides another degree of freedom by it being possible, for example, to use different types of sensor interface units simultaneously in the interface device.

For instance, a first type of sensor interface unit may comprise six sensor channels, i.e. it is designed to connect in total six sensors or sensor modules or the like to the processing unit of an appropriate sensor system. In contrast, a second type of sensor interface unit comprises e.g. eight sensor channels, i.e. it is designed to connect in total eight sensors to the processing unit of an appropriate sensor system. Advantageously, the interface device according to the invention can be configured flexibly by a suitable combination of the sensor interface units. It is also possible for a sensor interface unit to implement a different number of sensor channels.

For example, up to six sensors can be controlled by using only one sensor interface unit of the first type, and correspondingly up to twelve sensors by using two sensor interface units of the first type. Combining sensor interface units of the first and second type similarly allows up to fourteen sensors to be controlled.

In addition to manufacturing costs of the interface device according to the invention being optimized by using the sensor interface units, assembly costs are reduced by combining the required components in a sensor interface unit in each case, while also reducing the overall size of the complete arrangement.

Although it is possible in principle to design the sensor interface units according to the invention as separate modules containing discrete components or some integrated components, which can be integrated as individual components in the sensor device, in a particularly advantageous embodiment of the present invention, at least one sensor interface unit is implemented as an integrated circuit, preferably as an application-specific integrated circuit (ASIC). This results in a further reduction in the overall size of the complete arrangement and an increase in the manufacturing quality by a reduction in the number of components and furthermore also a simplification of the overall circuit arrangement.

In addition, by integrating the individual components, which are present as discrete components in conventional devices, in the sensor interface units according to the invention, an improvement in the electromagnetic compatibility of the interface device according to the invention is achievable at lower cost, in particular also because of the possibility of further integration of components required for the electromagnetic compatibility.

In a further extremely advantageous embodiment of the interface device according to the invention, the interface device, in particular an electronic printed circuit board or a substrate of the interface device, comprises at least two mounting positions for accommodating the sensor interface units. The combinability according to the invention of the interface device with one or more sensor interface units can also produce the situation here that one of the at least two mounting positions remains unused. This supposed disadvantage, however, is compensated for by the flexible configurability of the invention that results from the use of at least two sensor interface units. On the other hand, in other applications in which two mounting positions are used by suitable sensor interface units, optimum use is made of the surface area of the electronic printed circuit board or substrate.

Depending on the design of the sensor interface units, the mounting positions may either directly be suitable pads onto which the sensor interface units can be soldered, for instance, or even IC sockets or other connectors for the case in which the sensor interface units are provided e.g. on a separate circuit board or a separate substrate.

According to another highly advantageous embodiment of the present invention, the different sensor interface units are designed to be pin-compatible, so that different types of sensor interface units, which differ by the number of sensor channels for instance, can optionally be arranged both on a first and on a second or a further mounting position of the interface device. In order to achieve as simple a layout as possible of the electrical conductors on the interface device that is designed to suit all combinations of sensor interface units, in particular zero-ohm links or other connecting elements can be provided for the individual configurations if necessary, which can be fitted or not as required.

According to another highly advantageous embodiment of the invention, the sensor interface unit comprises 6 or 8 sensor channels. One sensor or sensor module can be controlled via each sensor channel, as already described. For instance, the interface device according to the invention can be used in an electronic sensor system comprising ultrasound sensors to connect the ultrasound sensors or sensor modules containing these sensors to the processing unit of the electronic sensor system. In detail, such a connection is made via the sensor interface units according to the invention, each of which can be connected for this purpose to the sensor or sensor module concerned and to the processing unit.

In the motor vehicle sector in particular, there are a large number of versions of electronic sensor systems based on ultrasound sensors, the main difference between these sensor systems being the number of sensor channels required. Here the interface device according to the invention advantageously provides the opportunity of selectively combining such sensor interface units with the interface device according to the invention, which, for example in combination with each other, provide a number of sensor channels that is greater than or equal to the number of sensors to be controlled. At the same time, as already explained, only a single sensor interface unit having a correspondingly low number of sensor channels can be provided for other versions of electronic sensor systems that have a simpler design, for example, and hence also require a lower number of sensor channels.

Another advantageous development of the present invention provides that the sensor interface unit comprises at least one actuator channel. The actuator channel enables the processing unit, for example, to control via the interface device according to the invention a signalling device, for instance, in particular an acoustic signalling device in the case of ultrasound parking assistant systems or the like. A power driver that may be required for this can also be integrated in the relevant sensor interface unit, but is preferably provided separately.

Another highly advantageous embodiment of the present invention is characterized in that the sensor interface unit comprises at least one level converter, in particular for converting signal levels of the sensors and the processing unit. For example, the processing unit of the sensor system works with an operating voltage of 5 Volts, while the sensors of the sensor system or the sensor modules comprising the sensor require an operating voltage of 12 Volts and consequently also receive and/or output signals having a voltage level of 12 Volts. In such cases, the relevant signal conversion can be performed directly by the interface device according to the invention or its sensor interface units.

It is also advantageously possible that sensor interface units also comprise different level converters or the like, for example in order to operate different sensor modules having different operating voltage levels.

It is particularly advantageous that the interface device according to the invention can be integrated, preferably together with the processing unit of the sensor system, in a control module controlling the sensor system.

The object of the present invention is also achieved by an electronic sensor system according to claim 11.

The sensors of the electronic sensor system according to the invention can advantageously be embodied as ultrasound sensors and/or as radar sensors and/or as optical sensors for example.

Further features, potential applications and advantages of the invention follow from the description below of exemplary embodiments of the invention, which are depicted in the single FIGURE of the drawing. All described or depicted features individually or in any combination form the subject of the invention, irrespective of how they are combined in the claims or referred back and irrespective of how they are formulated or depicted in the description or in the drawing respectively.

The single FIGURE of the drawing shows a schematic block diagram of an embodiment of the interface device according to the invention.

As shown in the FIGURE, the electronic sensor system 200 comprises a processing unit 230 and a multiplicity of ultrasound sensors, arranged here in two groups 210, 220, which are connected via the interface device 100 according to the invention to the processing unit 230 and hence can be controlled by this unit.

In the present example, the interface device 100 according to the invention comprises two sensor interface units 110, 120, with each sensor interface unit 110, 120 being assigned a group 210, 220 of the ultrasound sensors, i.e. the first sensor interface unit 100 is used to operate the first group 210, and the second sensor interface unit 120 is used to operate the second group 220 of ultrasound sensors.

The sensor interface units 110, 120 are used, in particular, for transmitting the control signals output by the processing unit 230 to the sensors 210, 220 and for transmitting sensor data received by the sensors 210, 220 to the processing unit 230. To do this they implement a suitable, preferably bi-directional electrical connection.

The processing unit 230 may be a microcontroller or even a digital signal processor (DSP), for example.

In order to equalize the different voltage levels between the processing unit 230 and the sensors 210, 220 or the sensor modules containing the sensors 210, 220, the sensor interface units 110, 120 comprise level converters (not shown in the FIGURE) from e.g. 5 Volts to 12 Volts and vice versa, which produce a suitable level conversion in both communications directions.

The sensor interface units 110, 120 integrated in the interface device 100 according to the invention are advantageously designed according to the relevant application so that they comprise a number of sensor channels equal to the number of sensors 210, 220 to be controlled.

The sensor interface units 110, 120 according to the invention can also comprise actuator channels in addition to the sensor channels, for instance to control acoustic or optical signalling devices. The actuator channels normally work only in one direction, i.e. from the processing unit 230 via the interface unit 110, 120 to the relevant actuator. In this case it is advantageous also to integrate suitable power drivers directly in the respective sensor interface unit 110, 120, so that using the interface device 100 according to the invention, a loudspeaker or a signal lamp, for example, can also be controlled directly by the processing unit 230. A separate power driver is likewise preferably used.

FIG. 1 shows by way of example that the first sensor interface unit 110 does not comprise an actuator channel, while the second sensor interface unit 120 comprises an actuator channel, which is used to control the acoustic signalling device 130.

In other applications in which accordingly a plurality of signalling devices may need to be controlled, the interface device 100 according to the invention can be combined with other sensor interface units 110, 120, which comprise a number of actuator channels commensurate with the requirements. Here it is possible to arrange the actuator channels solely in one of the two sensor interface units 110, 120 or to distribute them on both sensor interface units 110, 120.

It is particularly preferred for designing ultrasound-based parking assistant systems for motor vehicles to use those sensor interface units 110, 120 that comprise either six or eight sensor channels and no actuator channel or one actuator channel. These can advantageously be used to realize all known combinations of sensor configurations or suitable acoustic or optical signalling devices that are currently used in the motor vehicle sector.

The interface device 100 according to the invention is not limited to use in electronic sensor systems 200 employing ultrasound sensors. In fact, the interface device 100 according to the invention can also be used for controlling radar sensors, optical sensors or other sensors.

In addition to a direct assignment of the individual sensors 210, 220 to dedicated sensor channels of the relevant sensor interface unit 110, 120, multiplexers (not shown) can also be provided advantageously in the relevant sensor interface units 110, 120, said multiplexers allowing multiple use of data connections 105 formed between the processing unit 230 and the interface device 100 by connecting at certain times a first group of sensors to the processing unit 230 via the interface device 100 according to the invention and the data connections 105, and by connecting at certain times another group of sensors to the processing unit 230 via the same data connections 105 between the processing unit 230 and the interface device 100.

As already described, the interface device 100 according to the invention can also be provided with just one sensor interface unit 110 if this unit comprises a sufficient number of sensor channels or actuator channels to control all the required sensors 210 or actuators 130 respectively. Since the sensor interface units 110, 120 are preferably designed to be pin-compatible, at least as far as possible, the single sensor interface unit 110 can optionally be arranged on a first or a second mounting position of the sensor device 100 in the case mentioned here. In each case, the sensor device 100 according to the invention comprises at least two mounting positions in order to enable the advantageous combinability of sensor interface units 110, 120.

It is particularly advantageous for the sensor interface units 110, 120 to be designed as an ASIC, where, because of the capability of the sensor interface units 110, 120 to be combined in any way in the sensor device 100, only a small number of different versions of ASICs are needed in order to provide a sufficient number of sensor channels or actuator channels for all conceivable applications.

The interface device 100 according to the invention can preferably be integrated, together with the processing unit 230, in a control module controlling the sensor system 200.

In all, the interface device 100 according to the invention provides an advantageous, highly configurable connection of the processing unit 230 to the sensors 210, 220, which connection can include devices such as level converters or power drivers for controlling actuators. The possibility of choosing how to populate the interface device 100 with different types of sensor interface units 110, 120, which is afforded by the at least two mounting positions on the interface device 100, amongst other things, means that the interface device 100 can advantageously be configured so that the available resources such as sensor channels are optimally tailored to a given application in terms of their number and design, so that hardware is used efficiently and, in particular, the percentage of available but unused functions is minimized.

Using two different ASIC types for the sensor interface units 110, 120 already provides comprehensive configurability of the interface device 100 according to the invention and hence also of the sensor system 200 according to the invention.

The invention claimed is:

1. An interface device for connecting ultrasonic sensors of a motor vehicle to a processing unit of an electronic sensor system in the motor vehicle, the interface device comprising:
   ultrasonic sensors of a motor vehicle connected via the interface device to a processing unit of an electronic sensor system in the motor vehicle;
   a first sensor interface unit comprising a first number of sensor channels for connecting a first plurality of sensors to the processing unit;
   a second sensor interface unit comprising a second number of sensor channels, distinct from the first number of channels, for connecting a second plurality of sensors, distinct from the first plurality of sensors, to the processing unit, wherein the processing unit is for controlling the first and second plurality of sensors and analyzing sensor data obtained by the first and second plurality of sensors, wherein the interface device is able to accommodate simultaneously the first and second sensor interface units for connecting to the sensors, and wherein each of the first and second sensor interface units is selected from a plurality of sensor interface units each with a different number of sensor channels;
   the first sensor interface unit comprises six sensor channels and the second sensor interface unit comprises six sensor channels; and
   the first sensor interface unit comprises at least one actuator channel which allows the processing unit to control one selected from a group consisting of an acoustic signaling device and an optical signaling device, via the interface device.

2. The interface device according to claim 1, wherein at least one of the first and second sensor interface unit is implemented as an application-specific integrated circuit.

3. The interface device according to claim 1, wherein an electronic printed circuit board or a substrate of the interface device comprises at least two mounting positions for accommodating the first and second sensor interface units.

4. The interface device according to claim 1, wherein the first and second sensor interface units are pin-compatible.

5. The interface device according to claim 1, wherein the interface device is integrated with the processing unit in a control module controlling the sensor system.

6. The interface device according to claim 1, wherein the first sensor interface unit comprises at least one power driver for controlling an actuator channel.

7. The interface device according to claim 1, wherein the first sensor interface unit comprises at least one level converter for converting signal levels of the sensors and the processing unit.

8. An electronic sensor system, comprising:
a plurality of sensors and a processing unit for controlling the plurality of sensors and analyzing sensor data obtained by the plurality of sensors; and
an interface device according to claim 1, by means of which the sensors are connected to the processing unit.

9. The sensor system according to claim 8, wherein the plurality of sensors are one selected from a group consisting of ultrasound sensors, radar sensors, and optical sensors.

\* \* \* \* \*